United States Patent [19]

Lotoski

[11] 4,353,203

[45] Oct. 12, 1982

[54] QUICK-COUPLING LINK

[75] Inventor: John G. D. Lotoski, Victoria, Canada

[73] Assignee: Sea Trec Enterprises, Ltd., Seattle, Wash.

[21] Appl. No.: 236,576

[22] Filed: Feb. 20, 1981

[51] Int. Cl.³ .............................................. F16G 15/04
[52] U.S. Cl. .......................................... 59/85; 59/90
[58] Field of Search ................... 59/85, 78, 90, 93, 86, 59/80, 82

[56] References Cited

U.S. PATENT DOCUMENTS

| | | | |
|---|---|---|---|
| 5,740 | 1/1874 | Lamb | 59/78 |
| 975,323 | 11/1910 | Brown | 59/85 |
| 1,114,289 | 10/1914 | Rittenhouse . | |
| 1,376,299 | 4/1921 | Sullivan | 59/90 |
| 1,504,416 | 8/1924 | Baude . | |
| 1,588,533 | 6/1926 | Elzey . | |
| 2,175,504 | 10/1939 | Ehmann | 59/85 |
| 2,217,052 | 10/1940 | Hall . | |
| 2,260,630 | 10/1941 | McKinnon | 59/78 |
| 3,027,615 | 4/1962 | Forney . | |
| 3,084,066 | 4/1963 | Dunmire | 59/78 |
| 3,246,464 | 4/1966 | Schommer | 59/85 |
| 4,063,583 | 12/1977 | Rieger et al. . | |

Primary Examiner—Gene Crosby
Attorney, Agent, or Firm—Christensen, O'Connor, Johnson & Kindness

[57] ABSTRACT

A quick-coupling link to be utilized in conjunction with an identical link has a slot in one of the longitudinal side portions of the link. A tab extends from the opposite longitudinal side portion to adjacent the slot. The tab spans the width of the slot. When a pair of identical links are joined, the tabs prevent the links from accidentally being uncoupled as the slots cannot be brought into disengaging alignment without bending the flexible tab away from the entry to the slot.

4 Claims, 7 Drawing Figures

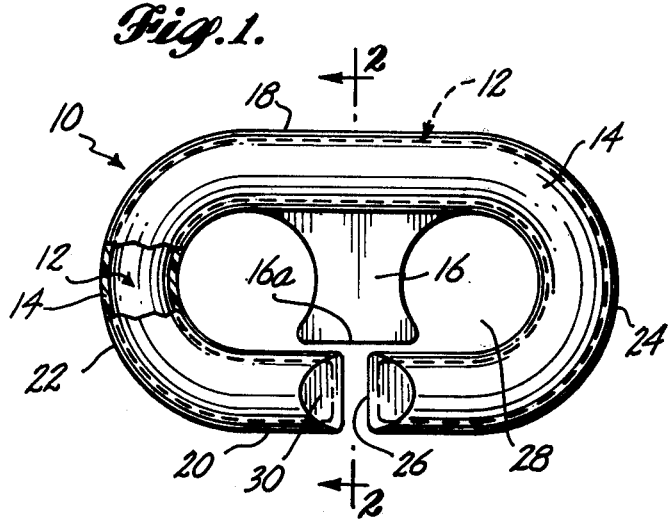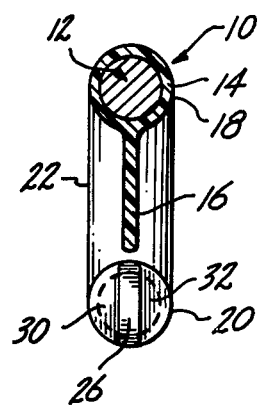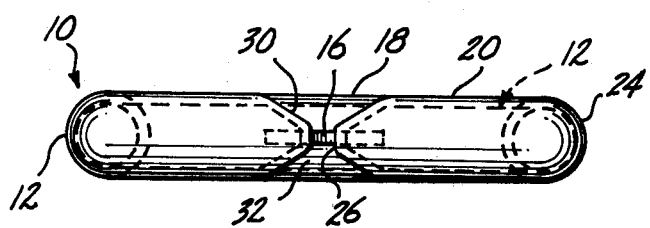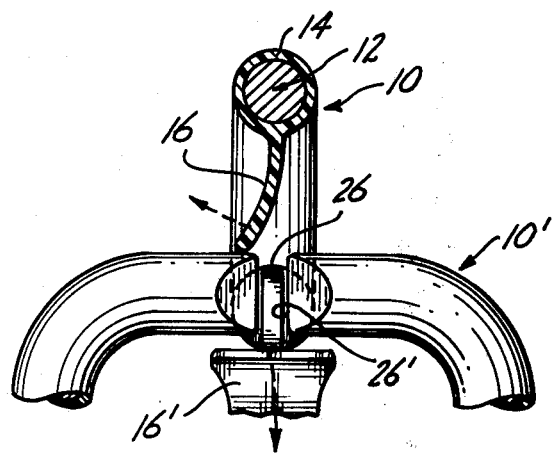

QUICK-COUPLING LINK

BACKGROUND OF THE INVENTION

The present invention relates to line connectors, and more particularly to quick-coupling links for quickly connecting and disconnecting chains and other flexible lines.

A great variety of coupling links is available in the prior art. Many, however, have moving parts that must be manipulated prior to joining the links and remanipulated after the links are joined. Others may not require manipulation upon connecting the links, however, may require manipulation of spring levers or the like when separating the links. Additionally, many prior art links have metal parts that are in metal-to-metal contact. When such links are used in a corrosive environment, such as near or in salt water, resulting corrosion can cause the moving parts to become inoperable or irreparably bonded to each other. Although corrosion-resistant metals can be utilized with conventional links, they tend to be quite expensive and difficult to work.

It is therefore a broad object of the present invention to provide a unique quick-coupling link that is easy to manufacture, that is of relatively low cost, that is easy to connect and disconnect with a link of the same type, that has no interengageable moving parts, that is not subject to corrosion, and that is relatively strong when compared to prior art links.

SUMMARY OF THE INVENTION

In accordance with the foregoing objects, and other objects that will become apparent to one of ordinary skill upon reading the following specification, the present invention provides a quick-coupling link comprising two components, a link member and a flexible tab. The link member has a pair of longitudinal side portions that are generally and preferably parallel in relationship. The side portions are joined by curved end portions. One of the side portions has a slot in the central region thereof. The slot has a thickness that is less than the diameter of the link. The slot is positioned generally along a diameter of the link and extends from the inner portion of the link to the outer portion of the link. The slot is joined to the surfaces of the link by outwardly diverging V-shaped notches that extend outwardly in a direction generally transverse to the slot. The flexible tab is joined to the other of the longitudinal side portions and extends across the central opening in the link from the one longitudinal side portion toward the other longitudinal side portion. The tab has a width that is greater than the width of the slot and a thickness that is generally less than the diameter of the link. The tab terminates adjacent the longitudinal side portion, spans the slot, and is separated from the one longitudinal side portion by a distance that is less than the diameter of a link.

BRIEF DESCRIPTION OF THE DRAWINGS

A better understanding of the present invention can be derived by reading the ensuing specification in conjunction with the accompanying drawings wherein:

FIG. 1 is a plan view of the link of the present invention;

FIG. 2 is a cross-sectional view of the link of FIG. 1 taken along section line 2—2;

FIG. 3 is a longitudinal side view of the link shown in FIG. 1;

FIG. 4 is a view of a link of the present invention being joined to another link of identical construction;

DETAILED DESCRIPTION OF THE INVENTION

Figure 5:
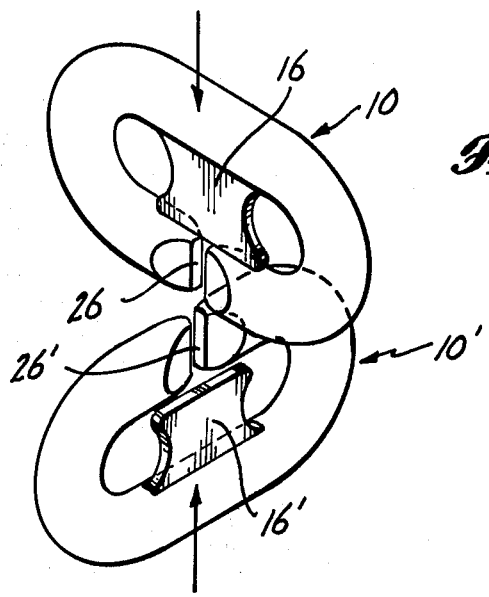
FIGS. 5, 6, and 7 are serial isometric views showing the sequence of joining two identical links constructed in accordance with the present invention.

Referring first to FIGS. 1, 2, and 3, the link 10 of the present invention comprises a strain-bearing metallic core 12 and a corrosion-resistant coating or film 14. A flexible and resilient central tab 16 is formed integrally with the coating 14. The link 10 has two generally parallel longitudinal side portions 18 and 20 joined by curved end portions 22 and 24. One of the longitudinal side portions 20 carries a slot 26 that is diametrically oriented relative to the link. The slot extends from the central opening 28 of the link to the exterior of the link. The slot 26 is situated in the central region of the longitudinal side portion 20 of the link. The slot has a width that is less than the diameter of the link. The slot is joined to the outer surfaces of the link by diverging V-shaped notches 30 and 32 that extend outwardly from and in a direction transverse to the slot.

The tab 16 is joined to the other longitudinal side portion 18 of the link 10 and extends across the central opening 28 of the link. The tab has a width, the dimension measured in the same direction as the end-to-end direction of the link, that is greater than the width of the slot 26. The thickness of the tab, however, is preferably less than the diameter of the link and certainly is sufficiently small so that when composed of the proper material will render the tab relatively flexible in a direction transverse to its width. The tab terminates adjacent the longitudinal side portion 20 carrying the slot 26 and is separated from that end portion by a distance that is less than the diameter of the link. Thus, the edge 16a of the tab 16 adjacent the longitudinal side portion 20 extends across the width of the slot 26 preventing a member having a thickness greater than the slot and greater than the distance between the tab and the longitudinal side portion from having access to the slot unless the tab 16 is flexed out of the way. At least a portion of the side edges of the tab 16 are spaced from the end portions 22 and 24 of the link by a distance greater than the link diameter so that the tab does not prevent relatively free movement of an interconnected link.

The corrosion-resistant coating 14 and the tab can be integral and thus formed of the same material, provided that a tab formed of the material in accordance with the invention is both flexible and resilient. Any of a variety of synthetic polymers can be used for the coating and tab including polyethylene, polytetrafluoroethylene and nylon. When a corrosion-resistant film is employed, the load-bearing link can be constructed from ordinary steel or other materials that might otherwise be subject to corrosion in hostile environments, thus reducing the cost of the link.

Figure 6:
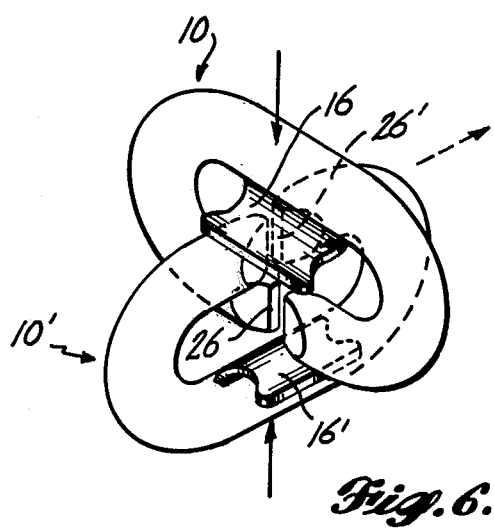
Figure 7:
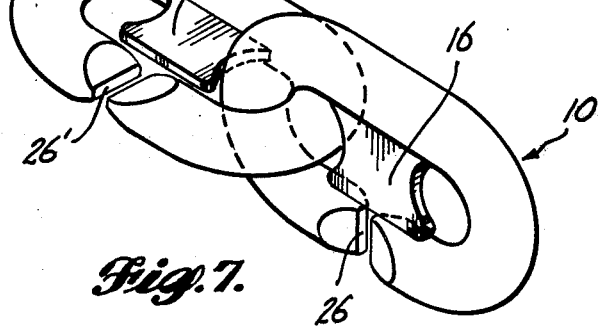

Referring now to FIG. 4, it is intended that a link just described be utilized in conjunction with a link of identical construction and design. In this manner, two links 10 and 10' can be joined by first aligning them in orthogonal relationship to each other with the respective slots 26 and 26' in juxtaposed relationship. (See FIG. 5.) The links 10 and 10' are then moved toward each other in the directions of the solid arrows so that the slot-bearing longitudinal side portions of the links interengage. When the side portions of the links reach the location of the respective tabs 16 and 16′, side pressure is simultaneously brought to bear on each of the tabs by appropriately moving the opposing link in a direction generally orthogonal to the direction of the width dimension of the tabs 16 and 16′. (See the dashed arrows of FIG. 6.) While still pushing the links together in the original direction, this coaction will cause the tabs 16 and 16′ to flex allowing the two links 10 and 10′ to be completely interengaged. Once the tabs are bent, the links are moved so that the curved end portion 24 of the first link 10 is engaging a curved end portion 22′ of the other link 10′. When the curved end portions of two links are engaged the tabs 16 and 16′ spring back to their original positions adjacent the slots, thus preventing the links from becoming accidentally disengaged. The links are now ready for transmitting a tension load along their longitudinal dimensions. The links are disengaged by reversing the procedure just set forth.

It is to be understood that each of the links can be permanently or otherwise attached by conventional means to other chains, lines, or ropes. The purpose and intent of the link of the present invention is to be able to quickly couple and uncouple one line or chain from another line or chain while being reasonably assured that the links will remain coupled under use, especially when the tension is relieved from the links so that they can freely move relative to each other. Were it not for the flexible tab of the present invention, the links could readily become accidently disengaged when the tension load is taken off the links.

Thus, the present invention has been described in relation to a preferred embodiment. One of ordinary skill after reading the foregoing specification will be able to effect various alterations, substitutions of equivalents and other changes without departing from the broad scope and general nature of the invention as disclosed. For example, the link has been described in relation to a link having a circular cross section. One of ordinary skill will readily recognize that the concepts of the invention will work equally well with a link having a square or other cross section. It is therefore intended that the protection afforded by Letters Patent hereon be limited only by the definition contained in the appended claims and equivalents thereof.

The embodiments of the invention in which an exclusive property or privilege is claimed are defined as follows:

1. A quick-coupling link comprising:
    a link having longitudinal side portions joined by curved end portions, one of said side portions having a slot in the central region thereof, said slot having a thickness less than the diameter of said link, said slot being positioned generally along a diameter of said link and extending from the inner portion of said link to the outer portion of said link, said slot being joined to the upper and lower surfaces of the link by outwardly diverging V-shaped notches that extend transversely from said slot, and
    a flexible tab joined to the other of said longitudinal side portions and extending across the central portion of said link, said tab having a width greater than the width of said slot, said tab terminating adjacent said one longitudinal side portion and being separated from said one side portion by a distance less than a diameter of said link.

2. The quick-coupling link of claim 1 wherein said link is comprised of a load-bearing composition, said link being coated with a corrosion-resistant film.

3. The link of claim 2 wherein said film comprises a polymeric material, said tab being composed of the same polymeric material and being integral with and joined to said film.

4. The link of claim 1 wherein said tab is spaced from each of said end portions by a distance greater than the diameter of said link.

* * * * *